(12) United States Patent
Conti et al.

(10) Patent No.: US 7,295,013 B2
(45) Date of Patent: Nov. 13, 2007

(54) REMOTELY OPERABLE MEASUREMENT SYSTEM AND METHOD EMPLOYING SAME

(75) Inventors: Ugo Conti, El Cerrito, CA (US); Edward Nichols, Berkeley, CA (US)

(73) Assignee: Schlumberger Technology Corporation, Sugar Land, TX (US)

( * ) Notice: Subject to any disclaimer, the term of this patent is extended or adjusted under 35 U.S.C. 154(b) by 177 days.

(21) Appl. No.: 10/907,657

(22) Filed: Apr. 11, 2005

(65) Prior Publication Data

US 2006/0226842 A1    Oct. 12, 2006

(51) Int. Cl.
G01V 3/08 (2006.01)
G01V 3/00 (2006.01)

(52) U.S. Cl. .................. 324/350; 324/348; 324/365

(58) Field of Classification Search ............... 324/323, 324/353, 347–350, 365; 367/15–19; 405/203, 405/206–208
See application file for complete search history.

(56) References Cited

U.S. PATENT DOCUMENTS

| | | | |
|---|---|---|---|
| 3,346,838 A | 10/1967 | Johnson, III et al. | |
| 4,160,229 A | 7/1979 | McGough | |
| 4,617,518 A | 10/1986 | Srnka | |
| 4,633,182 A | 12/1986 | Dzwinel | |
| 4,733,379 A | 3/1988 | Lapetina et al. | |
| 5,770,945 A * | 6/1998 | Constable | 324/350 |
| 6,188,221 B1 | 2/2001 | Van de Kop et al. | |
| 6,288,976 B1 | 9/2001 | Ambs | |
| 6,339,333 B1 | 1/2002 | Kuo | |
| 6,628,119 B1 | 9/2003 | Eidesmo et al. | |
| 6,677,757 B2 | 1/2004 | Fine et al. | |
| 6,696,839 B2 | 2/2004 | Ellingsrud et al. | |
| 6,717,411 B2 | 4/2004 | Ellingsrud et al. | |
| 6,720,771 B2 | 4/2004 | Gupta et al. | |
| 6,842,006 B2 | 1/2005 | Conti et al. | |
| 2004/0108854 A1 | 6/2004 | Nichols | |

(Continued)

FOREIGN PATENT DOCUMENTS

GB    2070345    9/1981

(Continued)

OTHER PUBLICATIONS

Boerner, David E. et al., Orthogonality in CSAMT and MT Measurements, Geophysics, vol. 58, No. 7, Jul. 1993, pp. 924-934.

(Continued)

*Primary Examiner*—Bot LeDynh
(74) *Attorney, Agent, or Firm*—Kevin P. McEnaney; James L. Kurka; Jonna Flores

(57) ABSTRACT

A marine measurement system is disclosed for obtaining measurements in an underwater operating environment. The system includes a base structure having a top surface, a bottom surface, and cavities provided therebetween. The cavities are also open to the top surface. The measurement system further includes measurement equipment (e.g., electronic equipment and/or instrumentation), which are retained in the cavities. A diaphragm membrane is applied adjacent the top surface and seals the cavities. The diaphragm member is positioned in pressure communication with the operating environment. Furthermore, the cavities are defined by the membrane and the base structure and filled with a pressure compensating fluid that is in pressure communication with the operating environment through the diaphragm membrane.

25 Claims, 5 Drawing Sheets

U.S. PATENT DOCUMENTS

2005/0264294 A1 12/2005 Constable

FOREIGN PATENT DOCUMENTS

| GB | 2418914 | 4/2006 |
|---|---|---|
| WO | WO01/57555 | 8/2001 |
| WO | WO02/14906 | 2/2002 |
| WO | WO0214906 | 2/2002 |
| WO | WO03/034096 | 4/2003 |
| WO | WO03/048812 | 6/2003 |
| WO | WO2004/008183 | 1/2004 |
| WO | WO2005006022 | 1/2005 |

OTHER PUBLICATIONS

Chave, Alan D. et al., Controlled Electromagnetic Sources for Measuring Electrical Conductivity Beneath the Oceans, Journal of Geophysical Research, vol. 87, No. B7, pp. 5327-5338, Jul. 10, 1982.
Chave, Alan D. et al., Electrical Exploration Methods in Applied Geophysics vol. 2, Electrical Exploration Methods for the Seafloor, Chapter 12, 1991, pp. 931-966.
Constable, S. et al., Marine Controlled-Source Electromagnetic Sounding, Journal of Geophysical Research, vol. 101, No. B3, Mar. 10, 1996, pp. 5519-5530.
Constable, S. et al., Occam's Inversion: A Practical Algorithm for Generating Smooth Models from Electromagnetic Sounding Data, Geophysics, vol. 52, No. 3, Mar. 1987, pp. 289-300.
Edwards, R. Nigel, On the Resource Evaluation of Marine Gas Hydrate Deposits Using Sea-Floor Transient Electric Dipole-Dipole Methods, Geophysics vol. 62, No. 1, Jan.-Feb. 1997, pp. 63-74.
Edwards, R.N., Controlled Source Electromagnetic Mapping of the Crust, Encyclopedia of Solid Earth Geopysics, ed. James D. Van Nostrand Reinhold, New York, 1989, pp. 127-138.
Yuan, J. et al., Electromagnetic Assessment of Offshore Methane Hydrate Deposits on the Cascadia Margin, American Geophysical Union Fall Meeting, San Francisco, 1998, pp. 363-375.
Kearey, Philip, The Encyclopedia of the Solid Earth Sciences, Blackwell Scientific Publications.
Evans, Rob L. et al., On the Electrical Nature of the Axial Melt Zone at 13 Degress N on the East Pacific Rise, Journal of Geophysical Research, vol. 99, No. B1, Jan. 10, 1994, pp. 577-588.
Flosadottir, A. et al., Marine Controlled-Source Electromagnetic Sounding, Journal of Geophysical Research, vol. 101, No. B3, Mar. 10, 1996, pp. 5507-5517.
U.S. Dept. of Energy Office of Basic Energy Sciences, Division of Engineering and Geosciences, Two and Three-Dimensional Magnetotelluric Inversion, Technical Report: Dec. 1, 1991-May 31, 1994.
Grant, I.S. et al., Electromagnetism, Second Edition, John Wiley & Sons.
Kaufman, A. et al., Methods in Geochemistry and Geophysics, 16.
Kvenvolden, K., A Primer on the Geological Occurrence of Gas Hydrate, Gas Hydrates: Relevance to World Margin Stability and Climate Change, Geological Society, London, Special Publications, 137, 9-30.
MacGregor, L. et al., The RAMESSES Experiment—III. Controlled-Source Electromagnetic Sounding of the Reykjanes Ridge.., Geophys. J. Int. 1998, 135, pp. 773-789.
MacGregor, L. et al., Use of Marine Controlled Source Electromagnetic Sounding for Sub-Basalt Exploration, EAGE 61st Conference and Technical Exhibition, Helsinki, Finland, Jun. 7-11, 1999.
Nekut, A. et al., Petroleum Exploration Using Controlled-Source Electromagnetic Methods, Proceedings of the IEEE, vol. 77, No. 2, Feb. 1989.
Sinha, M. C. et al., Evidence for Accumulated Melt Beneath the Slow-Spreading Mid-Atlantic Ridge, Phil. Trans. R. Soc. Land. A, 355, 1997, pp. 233-253.
Sinha, Martin, Controlled Source EM Sounding: Survey Design Considerations for Hydrocarbon Applications, LITHOS Science Report Apr. 199, 1, 95-101.
Sinha, M. et al., An Active Source Electromagnetic Sounding System for Marine Use, Marine Geophysical Researches 1990, 12: 59-68.
Tseng, H. et al., A Borehole-to-Surface Electromagnetic Survey, Geophysics vol. 63, No. 5, pp. 1565-1572.
Das, Umesh C., Apparent Resistivity Curves in Controlled-Source Electromagnetic Sounding Directly Reflecting True Resistivities in a Layered Earth, Geophysics vol. 60, No. 1, Jan.-Feb. 1995, pp. 53-60.
Das, Umesh C., Frequency- and Time-Domain Electromagnetic Responses of Layered Earth-A Multiseparation, Multisystem Approach, Geophysics vol. 60, No. 1, Jan.-Feb. 1995, pp. 285-290.
Thompson, Arthur H. et al., U.S. Statutory Invention Registration H1490, Sep. 5, 1995.
Walker, Peter W. et al., Parametric Estimators for Current Excitation on a Thin Plate, Geophysics vol. 57, No. 6, Jun. 1992, pp. 766-773.
Ward, S.H. et al., Electromagnetic Theory for Geophysical Applications, in Investigations in Geophysics: Electromagnetic Methods in Applied Geophysics, ed. Nabighian, Society of Exploration Geophysicists, Oklahoma, 1988.
Yuan, J. et al., The Assessment of Marine Gas Hydrates through Electrical Remote Sounding: Hydrate without a BSR?, Geophysical Research Letters, vol. 27, Aug. 2000, pp. 2397-2400.
Yuan, Edwards et al., Electromagnetic Assessment of Offshore Methane Hydrate Deposits on the Cascadia Margin, MARELEC 1999.
Maurer, Hansruedi et al., Optimized Design of Geophysical Experiments, SEG Paper.
Grant, I.S. et al., Electromagnetic Waves, Chapter 11, pp. 365-407.

* cited by examiner

REMOTELY OPERABLE MEASUREMENT SYSTEM AND METHOD EMPLOYING SAME

BACKGROUND OF THE INVENTION

1. Field of the Invention

The present invention relates generally to remotely operable measurement systems subject to relatively high environmental pressure such as subsea or marine exploration systems and a method of conducting measurements under such pressures. More particularly, the present invention relates to such remotely operable systems that contain electronic equipment and instrumentation ("measurement equipment") which may be sensitive to such high pressure. The invention further relates to a subsea or marine electromagnetic measurement system and a method of employing same.

2. Background Art

The present invention is particularly related to remotely operable electromagnetic measurement systems such as Magnetotelluric (MT) measurement systems. MT measurements are used to compute an electromagnetic impedance of selected earth formations. MT measurements are especially useful in regions where seismic imaging is inappropriate. For example, MT exploration is useful when evaluating geologic formations such as salts and carbonates. Salts, carbonates, and other particular formations may scatter seismic energy when seismic energy is propagated through them because of large velocity contrasts and inhomogeneities located within these formations, whereas the electromagnetic energy of the MT source fields propagates through these layers with less distortion. The MT method measures variations in the earth's magnetic and electric fields and does not use seismic energy to determine formation characteristics.

The MT method is typically used to measure an electromagnetic impedance as a function of frequency. Lower frequency provides a greater depth of penetration. The measured impedance may be transformed into an apparent resistivity and/or conductivity of the selected formations. Measuring impedance at several locations at various frequencies enables a determination of resistivity and/or conductivity as a function of both depth and horizontal position. Therefore, the MT method may be used to evaluate formation resistivity over large areas of the seafloor. The formation resistivities of the various formations in a selected area may then be analyzed to determine the formation geometry, the presence or absence of hydrocarbons in selected formations, and the like.

The MT method is a passive method that uses natural variations in the earth's magnetic field as an energy source. The method includes a subsea system that detects orthogonal magnetic and electric fields proximate the seafloor to define a surface impedance. The surface impedance, as described above, may be measured over a broad range of frequencies and over a large area where layered formations act in a manner analogous to segments of an electrical transmission line. An MT method that operates according to the principles described above is generally disclosed in U.S. Pat. No. 5,770,945 issued to Constable. The type of electromagnetic receiver disclosed therein can also be used to record electromagnetic signals which originated from various kinds of transmitter systems such as a towed cable bipole or magnetic loop source.

In addition, the receivers could be used to detect electromagnetic radiation originating from other types of signals such as emanating from naval ships (corrosion currents, electric circuits, generators, moving machinery) or from electric or magnetic sources located in boreholes or nearly land sources. The objective of these measurements could range from detailed exploration of the subsurface conductivity structure to monitoring naval traffic or operations to determining leakage signals from subsea cables.

Referring to FIG. 1, the subsea system usually includes an apparatus such as an magnetotelluric (Mt) measurement system 100 disclosed in the Constable patent. MT measurement system 100 includes a body 102 having a battery pack (not shown), a data acquisition system 104, two orthogonally oriented magnetic sensors 122 and 124, and four arms 139, 140, 142, and 144, each of which includes an electrode 118, 119, 120, 121 mounted at the end thereof. The electrodes 118, 119, 120, 121 are silver-silver chloride electrodes, and the magnetic sensors 122, 124 are magnetic induction coil sensors.

The arms 139, 140, 142, 144 are five meters long and approximately 2 inches in diameter. The arms 139, 140, 142, 144 are typically formed from a semi-rigid plastic material (e.g., polyvinyl chloride or polypropylene) and are fixed to the body. The five meter length of the arms 139, 140, 142, 144 makes it difficult to store, deploy, and retrieve the MT system 100 from a surface vessel (not shown) because the arms 139, 140, 142, 144 are fixed with respect to the body 102 (as shown in FIG. 1). The arms 139, 140, 142, 144 are designed to rest on the seafloor when the MT system 100 is in place.

The body 102 is attached to a releasable concrete anchor 128 that helps the MT system 100 sink to the seafloor after deployment. The body 102 generally rests on top of the anchor 128 when it is positioned on the seafloor. The anchor 128 may be released after MT measurements have been completed so that the body 102 may rise to the surface and be retrieved by the surface vessel (not shown).

The system shown in FIG. 1, therefore, consists of two orthogonal electric dipoles and two orthogonal magnetic sensors. The magnetic sensors are located proximate the power supply and the data acquisition system. Because the magnetic sensors are very sensitive so as to detect small changes in the earth's magnetic field, the magnetic sensors may also detect equivalent magnetic fields generated by current flowing from the power supply to the data acquisition system and other electrical equipment. These equivalent magnetic fields may therefore contaminate the data and must be removed from the data using digital signal processing techniques.

Moreover, the magnetic sensors are extremely sensitive to noise. Any motion of the body and/or arms are the MT system caused by sea currents or marine life moving past the MT system as well as the motion of conductive fluid around the corresponding sensor can be detected. These fluctuations in the magnetic field are also recorded by the magnetic sensors and must be removed using signal processing techniques.

SUMMARY OF THE INVENTION

Figure 1:
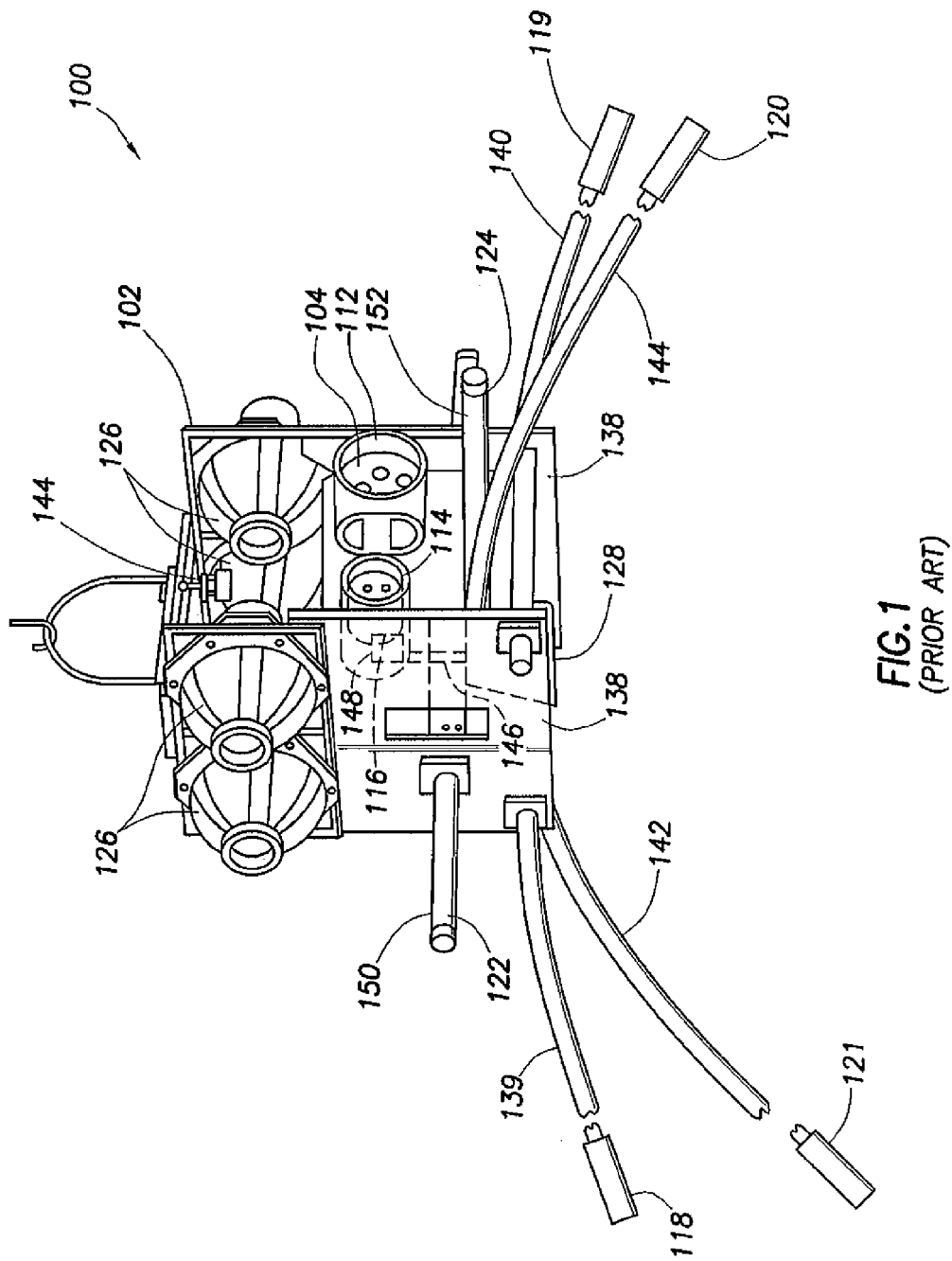
FIG. 1 illustrates a prior art electromagnetic measurement system.

A marine measurement system and method are disclosed for obtaining measurements in a subsea or underwater operating environment. In one aspect of the invention, the system includes a base structure having a top surface, a bottom surface, and cavities provided therebetween. The cavities are also open to the top surface. The measurement system further includes measurement equipment (e.g., electronic equipment and/or instrumentation, and related components), which are retained in the cavities. A diaphragm membrane is applied adjacent the top surface and seals the cavities. The diaphragm membrane is positioned in pressure communication with the operating environment. Furthermore, the cavities are defined by the diaphragm membrane and the base structure and filled with a pressure compensating fluid (preferably, an incompressible fluid such as oil) that is in pressure communication with the operating environment through the diaphragm membrane.

In another aspect of the invention, a pressure compensation system is provided for a remotely operable measurement system that is subject to relatively high environmental pressure. The pressure compensation system is provided for balancing the pressure with the measurement system within the operating environment. The pressure compensation system includes cavities in a base structure of the measurement system. The cavities retain measurement equipment and have open ends. Furthermore, a diaphragm membrane is applied adjacent the base structure to seal the open ends of the cavities (and the measurement equipment retained therein). The diaphragm membrane is positioned in pressure communication with the operating environment (i.e., operating pressure). The pressure compensation system also includes a fluid reservoir filling the cavities, preferably with an incompressible fluid such as oil. The fluid reservoir is configured to be in pressure communication with the diaphragm membrane. Preferably, the cavities of the pressure compensation system are in fluid pressure communication with one another. More preferably, a cover is also included for retaining over the diaphragm membrane (by sealing the diaphragm membrane over the cavities). Such a cover may have one or more apertures for communicating pressure to the diaphragm membrane.

In yet another aspect of the invention, an electromagnetic system is provided for obtaining measurements in an underwater operating environment. The system includes a base structure and electromagnetic measurement equipment retained by the base structure. Furthermore, the system includes an anchoring subsystem for anchoring the base structure to the seafloor upon deployment. The anchoring subsystem includes a releasable container (e.g., sandbags) containing anchor weight (e.g., sand). The container is made of a biodegradable material such as canvas, cotton, and the like. Furthermore, the anchoring subsystem includes a flotation package adapted to float the base structure to the surface upon release of the anchoring subsystem. A common flotation package will include gas-filled flotation balls. Preferably, the anchoring subsystem will also include a release mechanism for releasing the sandbag and this release mechanism will include a biodegradable retention line to secure the sandbag.

Other aspects, benefits, and advantages of the present invention will become apparent, to one skilled in the relevant mechanical, geological, and other relevant art, from the following description and/or drawings, and the appended claims.

DETAILED DESCRIPTION

The present invention relates generally to remotely operable measurement systems which are subject to relatively high environmental pressure, such as subsea or marine exploration systems. Such systems would include electromagnetic receiving systems, seismic data acquisition systems, acoustic systems, ocean bottom tilt meters, chemical analysis systems, and other systems that employ sensitive measurement equipment. Typically, these systems employ pressure vessels for storing the sensitive equipment and protecting the sensitive equipment from environmental conditions, i.e., high pressure. For purposes of the present description, certain electromagnetic measurement systems may be referenced and highlighted. The present invention should not, however, be limited to the specific systems described herein.

As used herein, the terms "measurement equipment" shall refer to any of the above-mentioned types of equipment, related equipment, and/or instruments. Such "measurement equipment" are any of those equipment, related parts and components which are sensitive to remote environmental operating conditions, and, thus requiring protection therefrom. Oftentimes, such equipment require special calibration or design. In other parts of the present Description, such "measurement equipment" may be referred to as "equipment," "electronic equipment," or "instrumentation."

Some of these systems are regularly operated at depths up to 6,000 meters and pressures up to 15,000 psi. The present invention is particularly related to marine electromagnetic system and method such as those described in U.S. Pat. No. 6,842,006, which issued Jan. 11, 2005. This patent teaches a seafloor electromagnetic measurement device for obtaining underwater measurements of earth formations. Authored by the current Applicants and assigned to the current Assignee, this patent publication includes background information that can facilitate the description of the present invention, and more particularly, highlight the Applicants' current contribution to the art. Accordingly, U.S. Pat. No. 6,842,006 is hereby incorporated by reference for all purposes and included as part of the present disclosure.

FIGS. 2-7 depict subsea or marine electromagnetic measurement systems embodying various aspects of the present invention. It should be noted that the embodiments depicted and described are provided for exemplary purposes and should not be construed as limiting the invention. For example, certain aspects of the inventive system provide a pressure compensation system that may be applicable to other structures and/or measurement systems not discussed herein. As another example, the anchoring system provided in some of the Figures can be adapted for use with other high pressure electromagnetic measuring devices, pressure compensation packages or systems, and other structures.

Figure 2:
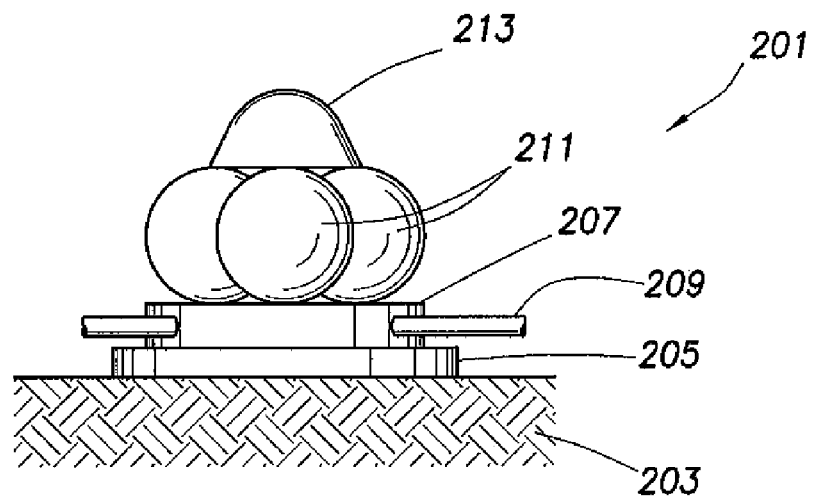
FIG. 2 is a schematic in elevation view of a subsea or marine electromagnetic measurement system, according to the present invention.

Referring now to FIG. 2, an electromagnetic measurement system 201 is provided that is particularly adapted for subsea or marine application. The measurement system 201 includes or incorporates electronic equipment and other equipment that require protection from the marine elements, including pressure and saltwater. The measurement system 201 is shown anchored or situated on a seafloor 203 by means of an anchor 205. The anchor 205 is preferably provided in the form of a weighted solid disc or slab 205 that rests conveniently on the seafloor 203. In further applications, the anchor 205 may be a durable concrete anchor that allows the measurement system 201 to sink to the seafloor 203 upon deployment. The anchor 205 may also be released to facilitate retrieval of the system 201 from the seafloor 203.

The measurement system 201 further includes a central body or base structure 207 that is secured atop the anchor 205. The base structure 207 preferably comes, as shown in FIG. 2, in the form of a solid, compact slab or disc. The base structure 207 retains most of the measurement equipment. In the measurement system 207 of FIGS. 2 and 3, four sensor arms 209 extend outward from the central body 201 in various directions. The arms 209 are fixed to the base structure 207 and are typically about five meters in length.

Furthermore, the measurement system 201 includes flotation balls 211 secured preferably atop the base structure 207, as is known in the art. The function of the flotation balls 211 is to facilitate deployment of the measurement system 201 in a predetermined manner. The flotation balls 211 also facilitate the retrieval of the measurement system 201 (i.e., upon release of the anchor 205). Further illustrated in FIG. 2 is a hydrodynamically shaped recovery float 213 provided above the flotation balls 211. The recovery float 213 is released to the surface to allow a ship to more easily find the system.

Figure 4:
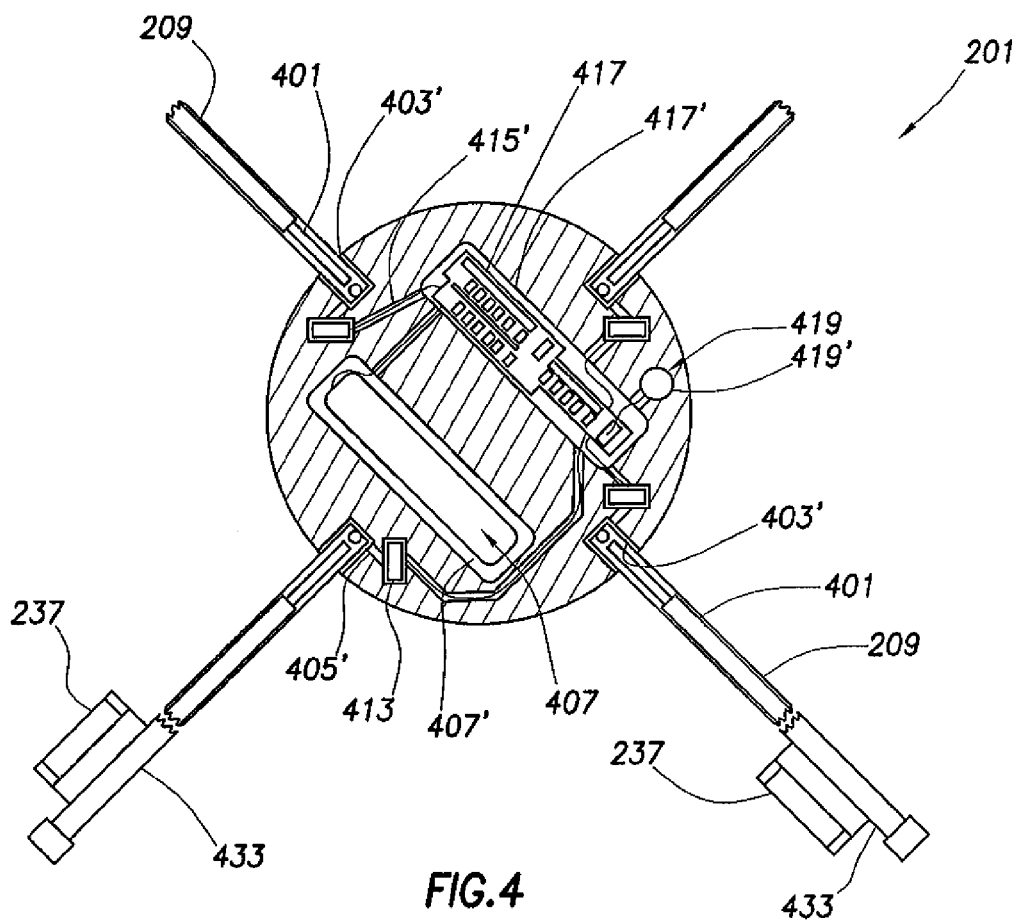
FIG. 4 is a top view of the base structure of the electromagnetic measurement system in FIG. 2.

FIG. 4 provides a top view of the base structure 207. The base structure 207 is preferably a thick, disk-shaped slab having a top surface 207a and bottom surface 207b. The slab is preferably a nonconductive, plastic (e.g., 1" thick polyethylene) material. More preferably, the slab is slightly buoyant and, thus, does not contribute to the underwater weight of the system 201.

As shown in FIG. 4, the sensor arm 209 contains a cable 401 that intrudes into the side of the base structure 207. The sensor arm 209 may further contain electrode 433 which may be positioned along any position along the entire length of sensor arm 209. (See e.g., FIGS. 2C, 6B and Detailed Description of '006 patent). The base structure 207 provides a port cavity or pot 403 into which a proximate end of the arm 209 conveniently and sealingly resides.

In accordance with the present invention, the measurement system 201 is provided a pressure compensation system for balancing the pressure within the cavities with the pressure of the external operating environment. The plastic base structure 207 is provided with a plurality of chambers or cavities in which the electronic equipment, cabling, and other sensitive components are situated and retained. The cavities are preferably sealed and is pressure compensated by way of interaction between a diaphragm and a fluid reservoir consisting of preferably incompressible fill fluid in the cavity. As used herein and as illustrated in FIG. 4, the cavities come in varying forms and sizes. The cavities may be in the form of cylindrical ports, such as port 403', channels 405', 415', depressions or wells 407', 413', 417', 419', and the like. Preferably, the cavities are carved into the slab of the base 207. More preferably, the various cavities are interconnected, and thus, in pressure fluid communication with one another. An important feature of the base 207 and more specifically, the cavities provided or carved therein, is that the cavities are open on one end preferably corresponding with a top surface 207a of the base 207. Moreover, the cavities are flush with the top surface 207a.

In the example of FIG. 4, the cavities are provided to accommodate measurement equipment including a battery pack 407, sensor electronics 413, a data acquisition system 417, and output connector 419. Each of these cavities is a relatively large indentation or chamber sized to accommodate the intended electronic or other sensitive equipment. Furthermore, the base 207 includes channels 407' and 415' to communicate cables that interconnect with the various electronic components. As mentioned above, in the preferred embodiment, each of these cavities is in mutual fluid communication, and thus, are pressure equalized.

Figure 5:
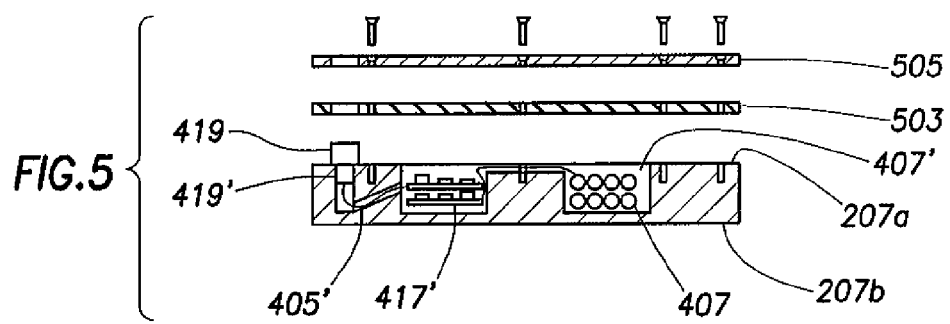
FIG. 5 is an exploded cross-sectional view of the base structure in FIG. 4, according to the present invention.

Referring now to FIG. 5, a blowup cross-sectional view of certain components of the measurement apparatus 201 is provided. FIG. 5 depicts a side view of the base 207 that illustrates the varying depths of the cavities carved therein. In one aspect of the present invention, a diaphragm 503 is provided adjacent the top surface 207a to communicate environmental pressure to the fluid (and thus to the equipment therein) in the cavities. In one embodiment, the diaphragm 503 is an elastomeric membrane 503 situated above the base 201 and applied on the top surface 207a. In a further embodiment, the elastomeric membrane 503 is preferably made of hypolon material. The elastomeric membrane 503 is preferably laid over the plastic base 207a so as to cover the open faces or ends of the cavities. To secure a seal against the top surface 207a, and over the cavities, a sealing plate 505 is preferably applied over the elastomeric membrane 503. The plate 505 is preferably made of a plastic material and is secured to the base 207 via screws or similar fasteners. By pressing the elastomeric membrane 503 against the top surface, the cavities of the base 207 is sealed from the surrounding subsea environment.

The diaphragm may also be made of other elastomeric materials, and other flexible and sufficiently deformable material (and configuration). The material must be suited to flex, so as to communicate pressure to the cavities. The flexibility of the diaphragm material also allows to account for thermal expansion of the fluid retained in the cavities. In some applications, a flexible metallic sheet may be employed.

In a further aspect of the invention, the cover plate 505 is provided with a plurality of apertures 507 in appropriate positions. The apertures 507 function to communicate environmental pressure onto the upper surface of the elastomeric membrane 503, thereby subjecting the elastomeric membrane 503 to the environmental pressure.

The number and size of apertures may vary, as long as environmental pressure can act on the diaphragm material, thereby communicating the pressure to the cavities. Preferably, the number and size of apertures are sufficient to prevent blockage by sediment and other debris.

In accordance with the present invention, the cavities are provided with a generally incompressible fluid such as an oil-based fluid. In this way, the elastomeric membrane 503 acts as a diaphragm and together with the incompressible fluid provide the pressure compensation mechanism. Furthermore, the membrane 503 and the oil in the cavities function to balance the pressure in the cavities. In this way, the pressure otherwise applied to the structure and/or the electronic equipment in the cavities is alleviated.

In many applications, an oil-based fluid will be the most preferred reservoir fluid. Other fluids may be employed in alternative embodiments, however. Preferably, the fluid of choice is an environmentally benign, generally incompressible, and low dielectric fluid.

In a conventional, prior art method of submerging electronic equipment, the sensitive measurement equipment is enclosed inside pressure vessels that provide protection from the surrounding water environment. At the typically great depths in which the subject measurement systems are deployed, the pressure applied to the equipment can be at very large magnitudes (i.e., 15,000 psi). As a result, the prior art pressure vessels are designed to be large vessels and therefore may be thick, bulky, and symmetrical (i.e., spherical) to avoid stress concentrations. The weight and volume attributed to these pressure vessels must be compensated for in designing the measurement system to be buoyant. As compared to the prior art system, the present inventive systems are smaller, less bulky, and less expensive to make. Further, the present inventive system, as depicted in the Figures do not have the buoyancy design demands of the prior art systems.

Moreover, the design of the cavities of the present system provides certain operational advantages. For example, direct electrical connections are provided inside the fluid filled cavities, without the need of specialized and delicate high pressure connectors. Proper design of the cavities (i.e., the channels) may be achieved to minimized the length of the cables between components. Minimization of cable length, especially the cables between sensors and preamplifiers, reduces or eliminates unwanted noise in the measurements that may result from long, free moving cables. Furthermore, the compact design of the plastic base provides for additional stacking capability inside a ship's hall, for example, as well as minimize the overall volume of the measurement system. Furthermore, additional reliability is achieved because of the reduced number of connectors. Further yet, better signal integrity is possible because the signals are not required to pass through high pressure seals.

One embodiment of the invention provides a pair of magnetic sensors or magnetometers 437 of the measurement system 201 installed as shown in FIG. 4. The provision of a magnetometer 437 is facilitated by certain attributes of the inventive system, including the absence of high pressure seals. The magnetometer 437 may be positioned on the sensor arm 209 and proximate the base structure 207. In the alternative, the magnetometer 437 may be positioned near a distal end of sensor arm 209, as shown in FIG. 4. Preferably, the arms 209 are long enough to position the magnetometers 437 a sufficient distance from the base structure 207, whereby a magnetic field generated by the flow of current within the base structure 207 are substantially undetected by the magnetometers 437 (e.g., a distance that is generally several meters). As described in the '006 patent, such positioning of the magnetometers 437 may effectively eliminate the interference and "noise" generated by the magnetic fields in the base structure 207. As discussed in the '006 patent, positioning the magnetometers 437 near the distal end of the arms 209 also adds extra mass to the ends of the arms 209. Such mass helps to ensure that the magnetometers 437 contact or is partially embedded in the seafloor 203. In this way, the mechanical stability of the arms and of the measurement system 201 is improved. As a further result, the flow of sea water or movement of marine life past the arms 209 and the magnetometers 437 does not tend to cause additional movement of the arm 209 or of the measurement system 201. This also helps to prevent introduction of anomalies in the recorded magnetic field data.

Figure 3:
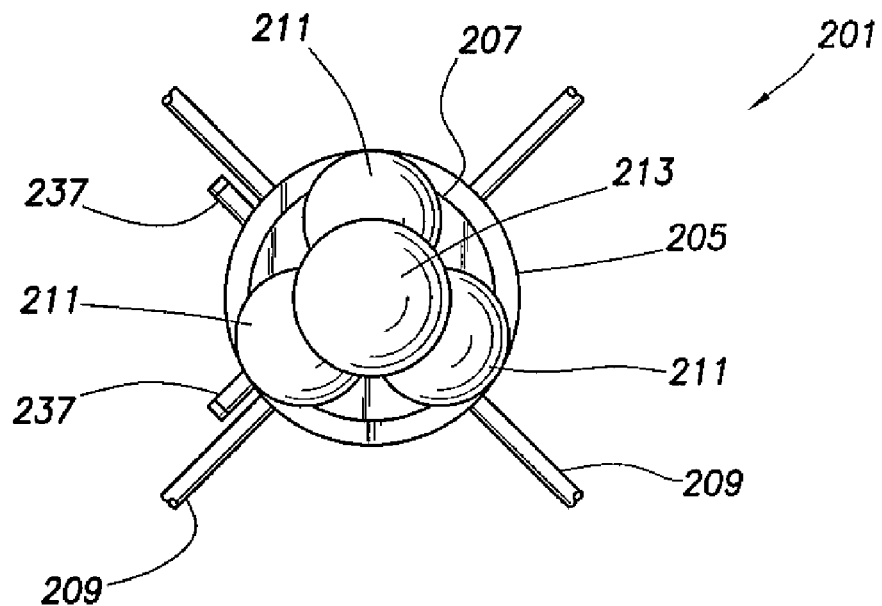
FIG. 3 is a top view of the electromagnetic measurement system in FIG. 2.

A plurality of magnetometers 237 may also be positioned adjacent the base structure 207, as shown in FIG. 3. This allows direct connection of the magnetometers 237 to electronics and/or other equipment inside the base structure 207, or at least by way of a minimal length of cable. Furthermore, the magnetometers 237 may mount adjacent the base structure 207 without use of high pressure seals and connectors. For example, a standard pressure fitting may be employed as a connection. In this arrangement, the magnetometers 237 are open to and, thus, advantageously disposed in fluid pressure communication with the oil reservoir in the cavities of the base structure 207. Thus, the differential pressure (between the environmental pressure and the reservoir fluid pressure) across a magnetometer 237 is minimized or eliminated entirely.

In a further embodiment of the invention, the magnetometers 437 are dB/dt induction sensors. These sensors maintain a dB/dt response which is based on induction of an electromotive force due to a time varying magnetic flux. Such a magnetic sensor provides a further advantage of a simpler construction, simplified cabling requirements and connectors.

It should be noted, however, that various types of sensors are suitable for and may be used with the measurement system according to the present invention. Furthermore, the measurement system may be used with both the magnetometer system and the electrode system, or with only one of these systems. Each of these embodiments will benefit from a pressure compensating system and from other aspects of the present invention as described herein.

Further reference should be made to the disclosure of the '006 patent (which has been incorporated by reference) to illustrate various arrangements and selections of magnetic sensors. This disclosure also provides various arrangements and selections of electrodes.

Figure 6A:
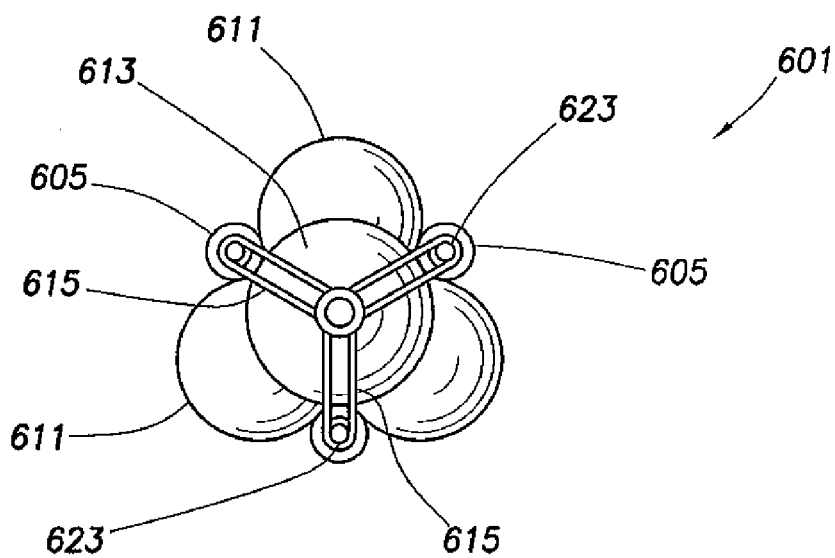
FIG. 6A is a top view of an alternative subsea electromagnetic measurement system, according to the present invention.
Figure 6B:
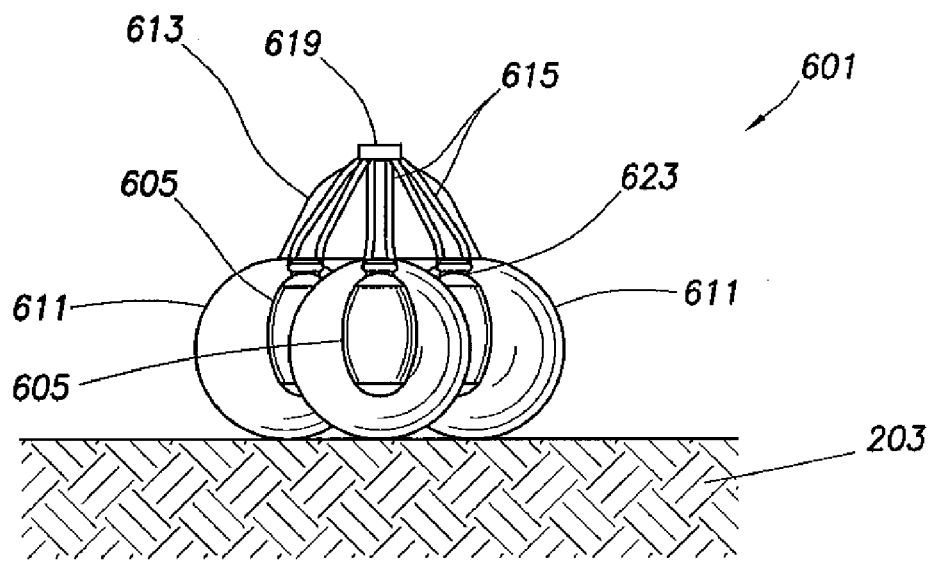
FIG. 6B is an elevation view of the measurement system in FIG. 6A.
Figure 7A:
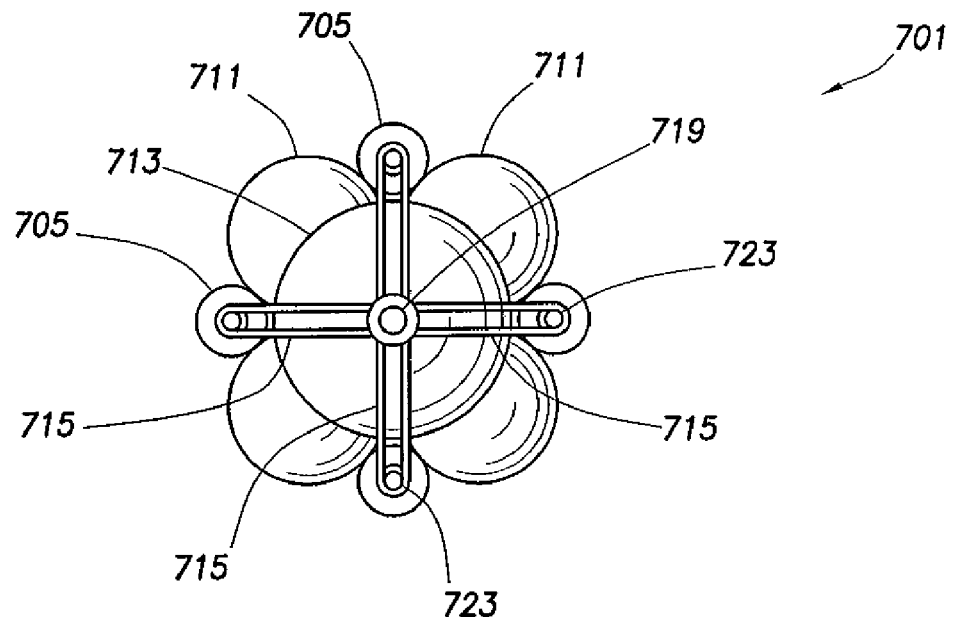
FIG. 7A is a top view of an alternative embodiment of the electromagnetic measurement system, according to the present invention.
Figure 7B:
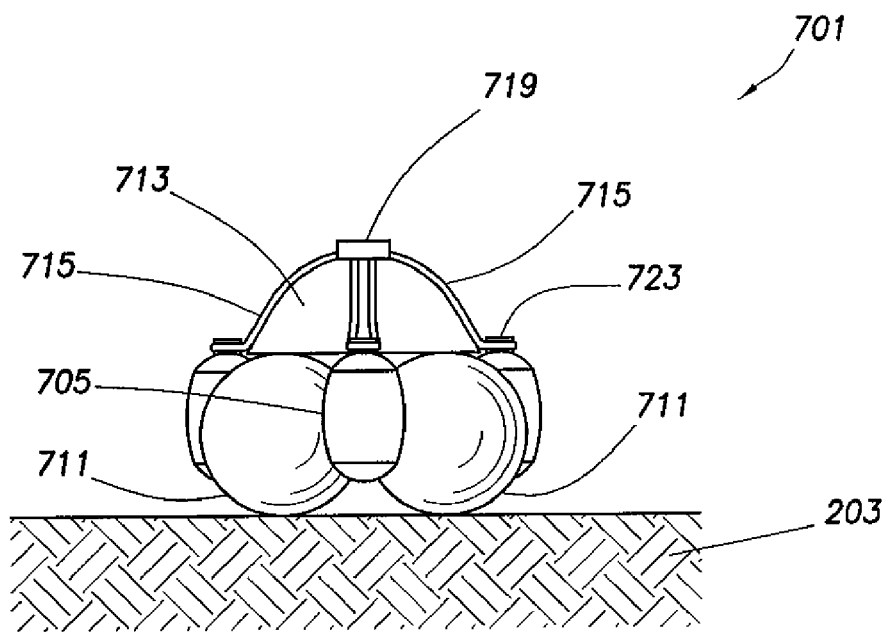
FIG. 7B is an elevation view of the measurement system in FIG. 7A.

FIGS. 6 and 7 depict alternative marine measurement systems according to the invention. These Figures highlight a novel deployment feature or means of the present invention. In the standard deployment of measurement systems, more specifically marine magnetotelluric/CSEM sensors and data acquisition systems, instrumentation packages are deployed from a ship and allowed to sink to the seafloor by means of a heavy anchor, such as a concrete slab. The anchor is released by an acoustic device triggered from the surface vessel and remains on the seafloor indefinitely.

The alternative embodiments depicted in FIGS. 6 and 7 provide a novel anchoring subsystem that is biodegradable. In another aspect of the invention, the anchoring system includes a biodegradable container for anchor weight. In yet another aspect of the invention, the anchoring system includes a plurality of sandbags (container for anchor weight) that are made of a biodegradable material such as cotton, canvas and the like.

FIGS. 6 and 7 illustrate alternative embodiments of the anchoring subsystem, according to the invention. Each of these embodiments utilizes a plurality of flotation packages including gas-filled flotation balls. FIG. 6 illustrates a three flotation ball system, whereas FIG. 7 illustrates a four flotation ball system. In respect to FIG. 6, FIG. 7 is depicted with like reference numerals (in the 700 series instead of the 600 series) indicating like elements.

It should be noted that deployment of the measuring system, and more specifically, of the anchoring subsystem 601, may be incorporated with conventional methods. Such incorporation will be apparent to one skilled in the art, having the present Description and/or drawings before them. The anchoring subsystem 601 utilizes a plurality of flotation balls 611a, a hydrodynamically shaped recovery float 613. Furthermore, the anchoring system 601 utilizes a plurality of biodegradable cotton sandbags 605 situated between the flotation balls 611. As shown in the initial anchoring state of FIG. 6, the releasable sandbags 605 are retained to the recovery float 613 by way of retention lines 615 secured to a retractable lines holder 619 atop the recovery float 613. An acoustic release motor is further operatively associated with these components, and is operable to release the sandbags 605. The recovery float 613 is preferably designed to be released at the same time as the sandbags 605. Release of the recovery float 613 and its ascent to the surface precedes that of the rest of the measurement system, thereby making recovery of the system by a ship much easier.

As shown in the Figures, the sandbags 605 are held in the deployment configuration by retention lines 615, which are tied to and close the mouth of the individual sandbags 605. These retention lines 615 loop around a retractable pin 623. The pin 623 may be retracted by a motor powered by the acoustic release motor (not shown), which, in turn, may be powered by the acoustic release system (which is standard in most measurement system), upon receiving an acoustic command from the surface. As the pin 623 is retracted, the sandbags 605 fall to the seafloor 203 and the flotation package returns the measurement system (or instrumentation package) to the surface. A further important aspect of this inventive system, is that in the event of acoustic release malfunction, the biodegradable sandbag 605 and retention lines 615 will, in time, rot, thereby releasing the measurement system from the seafloor 203. In yet another aspect of the invention, the retention lines 615 may be designed and/or constructed from material having a known rotting time, thereby ensuring predetermined release of the measurement system from the seafloor.

While the invention has been described with respect to a limited number of embodiments, those skilled in the art, having benefit of this disclosure, will appreciate that other embodiments can be devised which do not depart from the scope of the invention as disclosed herein. For example, various types and arrangements of sensors may be provided in a measurement system employing the inventive pressure compensating system. Accordingly, the scope of the invention should be limited only by the attached claims.

What is claimed is:

1. A marine measurement system for obtaining measurements in an underwater operating environment, said system comprising:
   a base structure having a top surface, a bottom surface, and cavities provided therebetween and open to said top surface,
   measurement equipment retained in said cavities; and
   a diaphragm membrane applied adjacent said top surface and sealing said cavities, said diaphragm member being positioned in pressure communication with the operating environment; and
   wherein said cavities are defined by said diaphragm membrane and said base structure and filled with a pressure compensating fluid in pressure communication with the operating environment through said diaphragm membrane.

2. The system of claim 1, wherein said diaphragm membrane is elastomeric.

3. The system of claim 1, wherein said base structure is a plastic plate structure having said cavities carved therein.

4. The system of claim 1, further comprising a cover retained over said diaphragm membrane to secure said diaphragm membrane to said base structure, said cover having one or more apertures communicating pressure to said diaphragm membrane.

5. The system of claim 1, wherein said pressure compensating fluid is an incompressible fluid.

6. The system of claim 5, wherein said incompressible fluid is an oil-based fluid.

7. The system of claim 1, wherein said cavities are in fluid pressure communication with one another.

8. The system of claim 7, wherein fluid in said cavities provide a fluid reservoir in fluid pressure communication with said diaphragm membrane.

9. The system of claim 1, wherein said cavities of said base structure include a plurality of interconnected channels wherein a plurality of said measurement equipment are situated.

10. The system of claim 1, further comprising a magnetometer positioned adjacent said base structure and connected with measurement equipment therein, said magnetometer being disposed in open communication with one of said cavities and in fluid pressure communication with said pressure compensating fluid in said cavity.

11. In a remotely operable measurement system subject to a relatively high environmental pressure, such as a subsea or marine exploration system and the like, a pressure compensating system for balancing the pressure within the measurement system with the operating environment, said pressure compensating system comprising:
   cavities in a base structure of the measurement system, said cavities retaining measurement equipment and having open ends;
   a diaphragm membrane applied adjacent the base structure to seal said open ends of said cavities and measurement equipment retained therein, said diaphragm membrane being positioned in pressure communication with the operating environment; and
   a fluid reservoir filling said cavities, said fluid reservoir being in pressure communication with said diaphragm membrane.

12. The pressure compensating system of claim 11, wherein said fluid in said fluid reservoir consists of an incompressible fluid.

13. The pressure compensating system of claim 12, wherein said cavities are in fluid pressure communication with one another.

14. The pressure compensating system of claim 13, further including a cover retained over said diaphragm membrane, said cover having one or more apertures for communicating pressure to said diaphragm membrane.

15. A seafloor electromagnetic measurement system for obtaining measurements of earth formations in an underwater operating environment, said apparatus comprising:
   a base structure having a top surface, a bottom surface, and cavities provided therebetween and open to said top surface;
   electromagnetic measurement equipment retained by said base structure; and
   a pressure compensating system including,
   a diaphragm membrane applied to said top surface and sealing said cavities, said diaphragm membrane being positioned in pressure communication with the operating environment, and
   a fluid reservoir filling said cavities, said fluid reservoir being in pressure communication with said diaphragm membrane.

16. The system of claim 15, wherein said pressure compensating system further includes a cover retained over said diaphragm membrane, said cover having a plurality of apertures for communicating pressure to said diaphragm membrane.

17. The system of claim 15, wherein said fluid is an incompressible fluid.

18. The system of claim 17, wherein said cavities are in fluid pressure communication with one another.

19. The system of claim 15, further comprising a releasable anchor for anchoring said base structure to said seafloor, said anchor including a sandbag made of a biodegradable material.

20. The system of claim 15, further comprising;
a plurality of arms extending from said base structure; and
at lease two magnetometers each coupled to one of said arms, wherein said magnetometers are positioned a selected distance from the base structure so that magnetic fields produced by electric currents in the base structure do not substantially affect the measurements made by the magnetometers.

21. The system of claim 15, further comprising at least one magnetometer positioned adjacent said base structure and connected with measurement equipment therein, said magnetic sensor being disposed in fluid pressure communication with said fluid reservoir.

22. A method of conducting subsea measurements with an electromagnetic measurement system, said method comprising the steps of:
providing an electromagnetic measurement system including a base structure, measurement equipment disposed in cavities in the base structure, and a diaphragm membrane sealingly applied over the cavities and positioned in pressure communication with the subsea environment external of the electromagnetic measurement system, wherein the cavities are filled with a pressure compensating fluid that is disposed in fluid pressure communication with the diaphragm;
deploying the measurement system to a subsea location such that the diaphragm membrane acts to communicate the pressure of the surrounding subsea environment to the pressure compensating fluid; and
conducting electromagnetic measurements from the subsea location.

23. The method of claim 22, wherein the electromagnetic measurement system further includes a magnetometer positioned adjacent the base structure in direct connection with measurement equipment in a cavity of the base structure and in fluid pressure communication with pressure compensating fluid in the base structure, said step of conducting electromagnetic measurements including measuring magnetic fields with the magnetometer.

24. The method of claim 22, wherein the base structure includes a plurality of cavities filled with the pressure compensating fluid and a plurality of measurement equipment disposed in the cavities, the cavities being interconnected such that during said deployment and conducting steps, said cavities are in fluid pressure communication with one another.

25. The method of claim 22, wherein said deploying step includes deploying the measurement system in the vicinity of the seafloor and at a depth greater than about 1,000 meters.

* * * * *